Nov. 8, 1966  A. SCHMIDT  3,284,115

BALL JOINT HOUSING

Filed Sept. 19, 1963

3,284,115
BALL JOINT HOUSING
Andreas Schmidt, Osterath-Bovert, Germany, assignor to A. Ehrenreich & Cie, Dusseldorf-Oberkassel, Germany
Filed Sept. 19, 1963, Ser. No. 310,101
Claims priority, application Germany, Sept. 27, 1962, E 23,598
3 Claims. (Cl. 287—87)

The present invention relates to a ball joint housing in which the passage for the ball stud is surrounded by an annular bead for connecting a sealing bellows. Such sealing bellows is connected to the ball joint housing by means of a wire, a clamping ring, or the like, whereby the bead will prevent the bellows from slipping off the housing.

Such annular body, however, will when forged parts are involved, make it necessary that the blank from which the housing is prepared will have to have a larger blank diameter and will also require an additional operation. If, on the other hand, the ball joint housing consists of drawn sheet metal, the manufacture of such annular bead encounters considerable difficulties.

It is, therefore, an object of the present invention to provide a ball joint housing with an annular bead, which will overcome the above-mentioned drawbacks.

It is also an object of the present invention to provide a ball joint housing with an annular bead, which can be manufactured easily and at considerably reduced costs over heretofore known ball joints of the type involved.

These and other objects and advantages of the invention will appear more clearly from the following specification in connection with the accompanying drawing, in which.

The present invention is characterized primarily in that the annular bead or ring is produced as a separate ring and, after being slipped over the housing, is flanged thereon, preferably in one operation together with the flanging-in of the closure lid.

Figure 1:
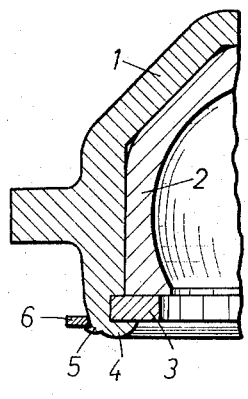
FIGURE 1 is a section through a forged ball joint housing portion in which the annular bead or ring is in one operation together with the flanging-in of the lid flanged onto the housing.

More specifically, FIG. 1 shows in section a forged ball joint housing 1 having arranged therein a ball cup 2 held in its position by a closure lid 3 rolled thereinto. For the sake of simplicity, the ball joint stud has been omitted. The closure lid 3 is held in its position by the folded over or rolled over edge 4. Simultaneously with the production of the rolled over edge 4, a slight outwardly extending fin 5 was created which secures a ring 6 previously slipped over housing 1, to the latter. Such ring 6, which may, for instance be stamped of sheet metal or may be butt-welded of steel wire, can be produced very inexpensively and can be mounted in a rather simple manner.

Figure 2:
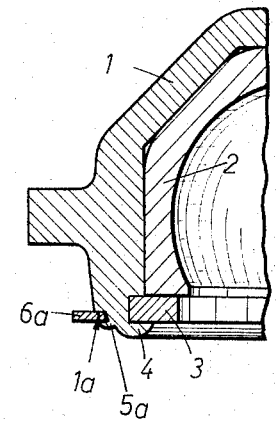
FIGURE 2 shows a section through a ball joint housing portion, according to which the flanging-on of the bead or ring is effected in a separate operation.

The arrangement of FIG. 2 differs from that of FIG. 1 primarily in that the housing 1 has a pronounced step 1a, and ring 6a has in a separate operation been flanged against said step by a flanged or rolled over portion 5a.

Figure 3:
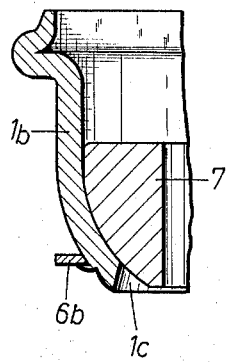
FIGURE 3 is a sheet metal housing for a ball joint in which the annular bead or ring is flanged onto the ball-shaped wall surface.

The modification shown in FIG. 3 illustrates a housing 1b drawn of sheet metal. In this arrangement the closure side is located opposite to the passage 1c for the ball joint stud (not shown). The closure lid is likewise not shown in FIG. 3. The ball stud is in a manner known per se not integrally connected to the ball portion 7. Ring 6b is slipped onto housing 1b and flanged thereonto.

Figure 4:
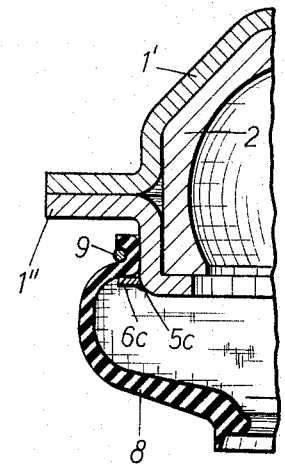
FIGURE 4 represents a section through a sheet metal ball joint housing with a cylindrical wall surface.

Finally, with regard to the embodiment illustrated in FIG. 4, the housing is composed of two sheet metal sections 1' and 1". In order to produce the annular bead which surrounds the passage for the ball stud, ring 6c is slipped onto the housing portion 1" and is held thereon in the manner described above by a fin 5c similar to the fins 5 and 5a of FIGS. 1 and 2.

For indicating the mounting of the seal, FIG. 4 shows a bellows 8 which is held on the housing portion 1" behind ring 6c by means of a clamping ring 9.

It is, of course, to be understood that the present invention is, by no means, limited to the particular constructions shown in the drawing and mentioned in the description, but also comprises any modifications within the scope of the appended claims.

What I claim is:

1. A ball joint housing having an opening for passing a ball stud therethrough, which includes annular retainer ring means forming a separate member from but being mounted on the outer periphery of said housing near said opening, and flange means forming an integral part of said housing and being located between said annular ring and the end of said housing adjacent the opening and firmly securing said annular retainer ring means to said housing.

2. In combination in a ball joint: a ball joint housing having an open end for passing a ball stud therethrough and being provided with a conical surface on the outside of said housing near said open end, said conical surface tapering toward the open end of said housing, and an annular member having a conical bore in conformity with said conical surface and mounted on said conical surface, said housing having substantially radially outwardly extending flange means engaging that end face of said annular member which faces in the same direction in which said conical surface tapers and firmly holding said annular member on said housing.

3. In combination in a ball joint: a ball joint housing having an opening for passing a ball stud therethrough, annular retainer ring means forming a separate member from but being mounted on the outer periphery of said housing near said opening, said housing having integral therewith between the retainer ring means and the stud opening a substantially radially outwardly extending fin means engaging said annular retainer ring means and firmly securing the same to said housing, sealing bellows means having a neck portion resting on said annular retainer ring means, and clamping means clamping said neck portion onto the outer periphery of said housing.

References Cited by the Examiner

UNITED STATES PATENTS

| | | |
|---|---|---|
| 2,288,160 | 6/1942 | Flumerfelt. |
| 2,758,365 | 8/1956 | Ricefield. |
| 2,857,656 | 10/1958 | Straub. |
| 2,971,787 | 2/1961 | Lincoln. |
| 3,027,182 | 3/1962 | Reuter _____ 287—87 |
| 3,052,477 | 9/1962 | Parker _____ 277—189 |
| 3,086,800 | 4/1963 | Runyon. |

CARL W. TOMLIN, *Primary Examiner.*

A. V. KUNDRAT, *Assistant Examiner.*